United States Patent Office 3,557,025
Patented Jan. 19, 1971

3,557,025
METHOD OF PRODUCING ALKALIZED ALUMINA AND PRODUCTS PRODUCED THEREBY
Robert B. Emerson and Wilton A. Brian, Baton Rouge, La., assignors to Kaiser Aluminum & Chemical Corporation, Oakland, Calif., a corporation of Delaware
No Drawing. Filed May 13, 1968, Ser. No. 728,839
Int. Cl. B01j 11/06; C01f 7/08; C04b 35/10
U.S. Cl. 252—463     9 Claims

ABSTRACT OF THE DISCLOSURE

An improved alkalized alumina capable of absorbing $SO_2$ is prepared from selectively calcined alumina which is capable of at least partial rehydration, by contacting the alumina with an $MHCO_3$ compound, wherein M is selected from alkali metals and $NH_4$ radical to form at least about 30% by weight alkalized alumina having the empirical formula of $MAl(OH)_2CO_3$.

BACKGROUND OF THE INVENTION

This invention relates to the preparation of an aluminous material containing at least about 30% by weight of alkalized alumina having the empirical formula of $MAl(OH)_2CO_3$, wherein M is selected from the group consisting of lithium, potassium, sodium and $NH_4$ radical. More particularly, the invention is directed to an improved method of making alumina shapes containing at least about 30% by weight of alkalized alumina from selectively calcined alumina which is capable of at least partial rehydration, and to the alumina shapes made thereby, which shapes have improved resistance to attrition, abrasion and crushing, while providing an increased surface area for absorption. The alumina material made according to the invention is particularly suitable for use as an absorbent for sulfur oxides from industrial combustion products, pulp and paper mill bleaching gases and the like.

It has heretofore been proposed to prepare a carbonated alkali metal aluminate of the general formula of $MAl(OH)_2CO_3$ by the reaction of an aqueous solution of an alkali metal carbonate with an aqueous solution of aluminum sulfate. The aluminate precipitate contains considerable amounts of sulfur in the form of occluded sulfates, which must be removed from the aluminate prior to use as an absorbent for sulfur oxides. This removal is accomplished by heating the aluminous material in the presence of hydrogen and is the subject matter of U.S. Pat. 2,992,884 to Bienstock et al. This and other prior art methods are known to produce aluminous materials containing alkalized alumina; however, the materials produced by these methods do not exhibit the attrition resistance, crushing strength, and high absorption capacity for sulfur oxides.

These disadvantages are overcome by the present invention, which provides a high strength and attrition resistant aluminous material containing at least about 30% by weight of alkalized alumina. The aluminous material of the present invention is particularly suitable when employed as an absorbent for sulfur oxides, as it exhibits in addition to its high physical strength characteristics excellent absorption capacity.

SUMMARY OF THE INVENTION

Accordingly, it is the primary purpose of the persent invention to present an advantageous method of produciig an aluminous material containing at least about 30% by weight of alkalized alumina of the empirical formula of $MAl(OH)_2CO_3$, wherein M is selected from the group consisting of lithium, potassium, sodium and $NH_4$ radical.

The steps involved in the present method comprise selectively calcining hydrated alumina to produce a transition alumina capable of at least partial rehydration, contacting the selectively calcined alumina with an $MHCO_3$ compound, in a stoichiometric ratio of 0.5 to 2.5 of $MHCO_3$ to $Al_2O_3$, at a temperature of from about 100° C. to about the temperature below that of the decomposition temperature of the produced alkalized alumina for a period of time required to form at least about 30% by weight of alkalized alumina. These and other purposes and advantages of the novel method of producing alkalized alumina and the alumina produced thereby will become apparent from the ensuing description thereof.

DETAILED DESCRIPTION OF THE INVENTION

According to the present invention, alumina hydrate particles, produced by, for example, the Bayer process, are selectively calcined to produce a transition alumina capable of at least partial rehydration. The term "transition alumina" refers to intermediate decomposition products, between stable hydrated crystalline forms and completely anhydrous corundum, resulting from selective calcination of various hydrated aluminas, e.g. gibbsite, bayerite, boehmite, etc. and which upon contact with moisture is capable of at least partial rehydration.

The calcination of the alumina hydrate can be accomplished by any suitable calcination process which provides a transition alumina. One such method is described in U.S. Pat. 3,222,129, to H. E. Osment et al. wherein the alumina hydrate particles are surrounded with a fuel-air mixture and are passed through a combustion zone at a flame temperature in the range of about 1650° to about 1926° C. for a period of time to ensure that each particle is partially calcined. The partially calcined alumina can be then quenched.

In one embodiment of the present invention the selectively calcined alumina particles are contacted with an $MHCO_3$ compound and the aluminous material containing at least about 30% by weight of alkalized alumina is recovered. This material is suitable to be employed as an absorbent for sulfur oxides.

In another embodiment of the present invention, the selectively calcined alumina is shaped prior to the contacting with the $MHCO_3$ compound to a desired configuration. For example, when the alumina particles are formed into spheres or nodules, the physical strength properties are considerably increased. Also, the shaped alumina, preferably of uniform size and shape, is more easily handled than particulate material. In addition, it is preferred to use the absorbent of the present invention in columns or beds, where high physical strength and resistance to attrition is required and the shaped aluminous material of the present invention will satisfy these requirements.

Although selectively calcined alumina can be shaped prior to the contacting with the $MHCO_3$ compound, it is equally feasible to shape the aluminous material containing the alkalized alumina, after the alumina is contacted with the $MHCO_3$ compound and the alkalized alumina is formed. Therefore, the process of the present invention contemplates the shaping either before the contacting with the $MHCO_3$ compound or after the formation of the alkalized alumina.

In case the selectively calcined alumina is preshaped prior to contact with the $MHCO_3$ compound, a small amount of water is added to the alumina to accomplish shaping and also to effect curing of the shaped alumina. Curing of the shaped alumina is in effect a partial rehydration, which will further increase the physical strength. In case the selectively calcined alumina is not to be shaped prior to the contact with the $MHCO_3$ compound, the shaping as mentioned before, can be accomplished after the formation of the alkalized alumina, whereby a shaped final product of equally high physical strength properties is obtained. Therefore, as hereinbefore described, the shaping and the curing step may be accomplished either before or after the formation of the alkalized alumina material with equally satisfactory results.

The selectively calcined alumina either shaped or in particle form is then contacted with an $MHCO_3$ compound. The $MHCO_3$ compounds contemplated by this invention include those in which M is lithium, potassium, sodium as well as $NH_4$ radical. It is also possible to form the $MHCO_3$ compound in situ by reacting under pressure $CO_2$ with the corresponding $M_2CO_3$ compound in the presence of water. Therefore, the formation of the $MHCO_3$ compound in situ is part of the present invention in the preparation of alkalized alumina.

The selectively calcined alumina particles are admixed with the $MHCO_3$ compound in a stoichiometric ratio of about 0.5 to about 2.5 $MHCO_3$ to alumina. The proportions of $MHCO_3$ to alumina can be varied as desired to control the properties of the produced aluminous material and to influence the weight ratio of alkalized alumina in the aluminous material. Low $MHCO_3$ ratios will produce lower alkalized alumina contents, while higher ratios will increase the alkalized alumina content in the aluminous material. Preferably, a stoichiometric ratio of 1.0 to 1.9 $MHCO_3$ to alumina is employed, although lower and higher ratios within the broad limits of 0.5 to 2.5 produce satisfactory products.

The $MHCO_3$ compound and the selectively calcined alumina shapes or particles can be contacted or admixed either in an aqueous system or in solid state. The admixing of the components may be carried out at room temperature and the admixture is then heated to the required temperature where the conversion of the selectively calcined alumina to the $MAl(OH)_2CO_3$ compound will take place.

In order to produce at least about 30% by weight of alkalized alumina a minimum temperature of about 100° C. should be maintained. The upper temperature for the conversion is limited by the decomposition temperature of the formed $MAl(OH)_2CO_3$ compound. Therefore, it is advisable to maintain the conversion temperature at least a few degrees below the decomposition temperature.

It is preferred to operate under pressure, to avoid losses of $MHCO_3$ during the conversion at temperatures exceeding 100° C.

The time period required for producing at least about 30% by weight alkalized alumina depends on the conversion temperature employed. It was, for example, found that if a temperature of about 105° C. was employed and the $MHCO_3$ to $Al_2O_3$ ratio was between 1.0 and 1.9, the conversion took approximately 130 hours. A slight rise in temperature, for example, 140° C., produced the desired alkalized alumina within 6–7 hours. A further increase of temperature to 150° C. accelerated the alkalized alumina formation and produced the alkalized alumina of the present invention within 5–6 hours. Careful control of the conversion temperature and the $MHCO_3$ concentration allows the production of the alkalized alumina in less than 1 hour.

Subsequent to the conversion of the selectively calcined alumina to the alkalized alumina, if produced in an aqueous system, the alkalized alumina is dried and recovered.

EXAMPLE 1

132 grams of selectively calcined transition alumina, produced according to U.S. Pat. 3,222,129, was nodulized in a pan about 3 feet in diameter and 18 inches deep. The pan was rotated at a predetermined speed and tilted about 20 to 45° to the horizontal. Water was sprayed into the pan to effect the nodulizing and the nodules of substantially uniform size were removed. The nodules were cured, by aging to harden them, in a sealed storage container for about 24 hours at about 80° C. The cured nodules were then placed into an autoclave and 360 grams of $NaHCO_3$ was added in an aqueous suspension. The autoclave was slowly heated to about 150° C. and maintained at that temperature for about 6.5 hours. Subsequently, the autoclave was opened and the nodules were dried at about 105° C.

Analysis of the nodules provided the following results: $CO_2$ percent 28.0, Al percent 19.21, Na percent 16.77. Differential thermal analysis of the nodules on a DuPont "Differential Thermal Analyzer" showed a $$NaAl(OH)_2CO_3$$

content of 70.2%. The nodules had an $SO_2$ absorption capacity of 27.1%, an attrition loss of 28.2% and high crushing strength.

For comparison purposes alkalized alumina was prepared according to U.S. Pat. 2,992,884 and nodulized as described above. The results obtained are compiled in the table below.

It was found that the shaped aluminous material produced according to the present invention and containing the alkalized alumina exhibited the maximum prysical strength, when the alkalized alumina content was at least about 30% and up to about 80% by weight. Shapes of higher alkalized alumina contents exhibited lesser strength, but still sufficient enough to be employed as absorbers in columns and beds.

The alkalized alumina produced according to the method of the present invention exhibits excellent physical strength properties and high absorption capacity for sulfur oxides. The table below provides comparative data for the alkalized alumina absorber produced by the method of the present invention and for alkalized aluminas produced according to prior art methods. For comparison purposes the $MHCO_3$ compound was $NaHCO_3$. Samples A and B were prepared according to the method of the present invention while Sample C was a synthetic dawsonite produced according to U.S. Pat. 2,992,884.

TABLE I

| | Sample A | Sample B | Sample C |
|---|---|---|---|
| Chemical Composition: | | | |
| $CO^2$, percent | 29.14 | 29.08 | 24.3 |
| NA, percent | 15.58 | 15.88 | 15.6 |
| Al, percent | 19.35 | 19.03 | 18.6 |
| Loss on ignition of 1,000° C. percent | 43.10 | 43.28 | 38.97 |
| S, percent | 0.00 | 0.00 | 1.00 |
| $Co^2$/Na ratio | 1,870 | 1,831 | 1,558 |
| Al/Na ratio | 1,242 | 1,198 | 1,192 |
| Physical Properties: | | | |
| Crushing strength (¹), lbs | 4.6 | 4.0 | 2.42 |
| Attrition loss (²), percent | 28.0 | 28.6 | 52.6 |
| Absorption capacity (³), percent | 19.0 | 24.2 | 14.5 |

¹ Crushing strength, twenty-five nodules were chosen in a random fashion from the samples and each nodule was subjected to pressure between two flat metal plates. The necessary pressure to crush each nodule was measured in lbs. and averaged for the twenty-five nodules, the average crushing strength in lbs. is given.

² Attrition loss, a sample of nodules is screened to obtain 30.0 grams in an approximate size range, e.g. 12 U.S. mesh, 14 U.S. mesh, or 16 U.S. mesh. The sample is then transferred to a 1,000 ml. standard Erlenmeyer flask which has a 1″ (2.54 cm.) diameter hole in the bottom thereof, the hole being covered with a screen of an approximate mesh wire (dependent upon the size range of sample—14 mesh screen for 12 mesh sample). A rubber stopper is inserted in the top opening of the flask, which stopper is penetrated with a metal inlet nozzle with an inside diameter of 0.19 in. The flask is then inverted fixed in this position andjconnected to an air supply system. This system consists of an air pressure regulating system, downstream from a chamber containing a drying agent, and a rotameter, calibrated to pass 6.1 s.c.f.m. dry air. Air is admitted to the test apparatus for a period of time, e.g. 30 minutes or 15 minutes depending on the size of the material tested. Following the air introduction, the material in the flask is screened on a screen of appropriate mesh size. The amount remaining on the screen is then weighed to the nearest 0.1 gram. The attrition loss is expressed as follows:

$$\text{Attrition loss percent} = \frac{(30.0 - \text{final wt.})}{30.0} \times 100$$

³ The term "absorption capacity percent" represents the amount of sulfur expressed as $SO_2$ in grams which is absorbed by 100 grams of alkalized alumina from flue gases under normal conditions.

As can be seen above, the invention provides a method of producing an alkalized alumina of high physical strength and excellent $SO_2$ absorption capacity. The method of the invention additionally reduces the number of processing steps heretofore required for the production of alkalized alumina and eliminates the necessity of purification of the alkalized alumina.

It is apparent from the above discussion that various changes and modifications may be made to the invention without departing from the spirit thereof. Accordingly, the scope of the invention should not be limited except by the appended claims.

What is claimed is:

1. A method for producing a shaped, high strength, alkalized alumina composite capable of absorbing $SO_2$ and containing at least about 30% by weight of a compound of the empirical formula $MAl(OH)_2CO_3$ which comprises:
   (a) preparing a selectively calcined transition alumina capable of at least partial rehydration;
   (b) shaping the transition alumina to a desired configuration and curing the alumina shape;
   (c) contacting the alumina shape with an $MHCO_3$ compound, wherein M is selected from the group consisting of lithium, potassium, sodium and $NH_4$ radical in a stoichiometric ratio of about 0.5 to about 2.5 $MHCO_3$ to $Al_2O_3$ at a temperature of from about 100° C. to about a temperature below that required to decompose the alkalized alumina for a period of time to form at least about 30% and up to about 80% by weight of alkalized alumina; and
   (d) recovering the product.

2. Method according to claim 1, wherein the $MHCO_3$ compound is $NaHCO_3$.

3. Method according to claim 1, wherein the $MHCO_3$ compound is $KHCO_3$.

4. Method according to claim 1, wherein the $MHCO_3$ compound is $LiHCO_3$.

5. Method according to claim 1, wherein the $MHCO_3$ compound is $NH_4HCO_3$.

6. Method according to claim 1, wherein the $MHCO_3$ compound is prepared in situ from $CO_2$ and the corresponding $M_2CO_3$ in the presence of water.

7. Method according to claim 1, wherein the stoichiometric ratio of $MHCO_3$ to $Al_2O_3$ is of from about 1.0 to about 1.9.

8. A method for producing a shaped high strength alkalized alumina composite capable of absorbing $SO_2$ and containing at least about 30% by weight of a compound of the empirical formula $MAl(OH)_2CO_3$ which comprises:
   (a) preparing a selectively calcined transition alumina capable of at least partial rehydration;
   (b) contacting the transition alumina with an $MHCO_3$ compound, where M is selected from the group conssiting of lithium, potassium, sodium and ammonia in a stoichiometric ratio of about 0.5 to about 2.5 of $MHCO_3$ to $Al_2O_3$ at a temperature of from about 100° C. to about a temperature below that required to decompose the alkalized alumina for a period of time to form at least about 30% and up to about 80% by weight of alkalized alumina;
   (c) shaping the alkalized alumina to a desired configuration and curing the alumina shapes; and
   (d) recovering the product.

9. Calcined alumina capable of at least partial rehydration having from at least about 30% and up to at least about 80% of its weight in the form of $MAl(OH)_2CO_3$, in which M is selected from the group consisting of lithium, potassium, sodium, and ammonium radical.

References Cited

UNITED STATES PATENTS

| | | | |
|---|---|---|---|
| 1,590,795 | 6/1926 | Asplundh | 23—63 |
| 2,783,124 | 2/1957 | Grote | 23—315 |
| 2,992,884 | 7/1961 | Bienstock et al. | 23—174 |
| 3,115,387 | 12/1963 | Lewin | 23—61 |
| 3,222,129 | 12/1965 | Osment et al. | 23—141 |

OSCAR R. VERTIZ, Primary Examiner

H. S. MILLER, Assistant Examiner

U.S. Cl. X. R.

23—315; 106—65; 252—476